United States Patent
Miyazaki

(10) Patent No.: US 7,751,335 B2
(45) Date of Patent: Jul. 6, 2010

(54) FAILURE HANDLING SYSTEM

(75) Inventor: Satoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 100 days.

(21) Appl. No.: 12/256,614

(22) Filed: Oct. 23, 2008

(65) Prior Publication Data
US 2009/0046575 A1 Feb. 19, 2009

Related U.S. Application Data

(63) Continuation of application No. PCT/JP2006/309004, filed on Apr. 28, 2006.

(51) Int. Cl.
H04L 12/42 (2006.01)
(52) U.S. Cl. ...................................... 370/244
(58) Field of Classification Search ................. 370/216, 370/217, 242, 244
See application file for complete search history.

(56) References Cited

U.S. PATENT DOCUMENTS

| 6,756,898 | B2 | 6/2004 | Ikematsu | |
|---|---|---|---|---|
| 7,050,399 | B2 | 5/2006 | Masuda | |
| 7,359,331 | B2 | 4/2008 | Takamichi | |
| 2003/0058106 | A1 | 3/2003 | Ikematsu | |
| 2004/0223503 | A1* | 11/2004 | Lynch et al. | 370/404 |
| 2008/0037581 | A1* | 2/2008 | Asano | 370/466 |

FOREIGN PATENT DOCUMENTS

| JP | 7-231353 | 8/1995 |
|---|---|---|
| JP | 2003-8532 | 1/2003 |
| JP | 2003-18159 | 1/2003 |
| JP | 2003-110585 | 4/2003 |
| JP | 2004-320683 | 11/2004 |
| JP | 2005-269507 | 9/2005 |

OTHER PUBLICATIONS

International Search Report dated Jul. 25, 2006, from the corresponding International Application.

* cited by examiner

Primary Examiner—Melvin Marcelo
(74) Attorney, Agent, or Firm—Katten Muchin Rosenman LLP

(57) ABSTRACT

A failure handling system capable of performing failure notification and shutoff control, thereby improving network operability. When failure is detected, an outgoing frame shutoff controller performs shutoff control on the local device such that the local device stops outputting communication frames to a receiving client device. A failure notifier notifies a network manager that the failure has been detected. On receiving a shutoff command, an incoming frame shutoff controller performs shutoff control on an originating client device such that the originating client device stops outputting the communication frames. A communication route manager manages communication routes through which the client devices communicate with each other across the network. On receiving a failure notification from a first transmission device, a shutoff information sender looks up the communication routes to identify a second transmission device connected with the originating client device, and sends a shutoff command to the second transmission device.

4 Claims, 16 Drawing Sheets

FAILURE HANDLING SYSTEM

This application is a continuing application, filed under 35 U.S.C. §111(a), of International Application PCT/JP2006/309004, filed Apr. 28, 2006.

BACKGROUND

1. Field

The present invention relates to failure handling systems, and more particularly, to a failure handling system for handling failure occurring on a network.

2. Description of the Related Art

Ethernet (registered trademark) denotes standards commonly used in LANs (Local Area Networks). While 10BASE-T (10 Mbps) is the most popular one among the standards, recent tendency toward higher-speed transmission has increased demand for standards enabling signal transmission at higher rates, such as Fast Ethernet with a transmission rate of 100 Mbps and Gigabit Ethernet with a transmission rate of 1 Gbps or 10 Gbps.

At the same time, Ethernet fails to meet users' needs in many respects, because of its long failure recovery time and the restrictions on transmission distance. Thus, there has been a trend to adopt the transmission technology of SDH/SONET (Synchronous Digital Hierarchy/Synchronous Optical Network) as a carrier, in order to meet the demand for higher-speed transmission while making up for the drawbacks and also to increase the transmission distance from LAN coverage to WAN (Wide Area Network) coverage.

Ethernet using SDH/SONET as its communication backbone is called EOS (Ethernet over SDH/SONET) and is one of the GFP (Generic Framing Procedure) techniques being standardized by ITU-T G.7041. GFP is a procedure for mapping frames with variable-length payloads, such as Ethernet frames, over SDH/SONET.

FIG. 14 illustrates an EOS network system. The EOS network system 100 comprises client devices 101 and 102, and EOS hosts 111 to 114. The EOS hosts 111 to 114 are included in an SDH network 110.

The client device 101 is connected to the EOS host 111 by client routes R1 and R2, and the EOS hosts 111 and 112 are connected to each other by SDH routes NW1 and NW2. The client device 102 is connected to the EOS host 112 by client routes R3 and R4.

Also, the client device 101 is connected to the EOS host 113 by client routes R5 and R6, and the EOS hosts 113 and 114 are connected to each other by SDH routes NW3 and NW4. The client device 102 is connected to the EOS host 114 by client routes R7 and R8.

When an Ethernet frame is transmitted from the client device 101 to the client device 102, for example, the client device 101 sends the Ethernet frame via the two client routes R1 and R5 to the respective EOS hosts 111 and 113.

The EOS host 111 maps the received Ethernet frame into an SDH frame according to the GFP protocol and sends the SDH frame to the EOS host 112 through the SDH route NW1. The EOS host 112 demaps the received SDH frame to thereby convert the SDH frame back to the Ethernet frame, and sends the Ethernet frame to the client device 102 via the client route R3.

Also, the EOS host 113 maps the received Ethernet frame into an SDH frame according to the GFP protocol and transmits the SDH frame to the EOS host 114 via the SDH route NW3. The EOS host 114 converts the received SDH frame back to the Ethernet frame by demapping, and sends the Ethernet frame to the client device 102 via the client route R7.

Thus, the use of the GFP protocol permits the client devices 101 and 102, each with Ethernet transmission interface function, to communicate Ethernet frames to each other across the SDH network 110.

As conventional GFP transmission techniques, there has been proposed a technique wherein a failure notification region is provided in the transport header of a GFP capsule to transfer information about the occurrence of failure on a transmission line network (e.g., Japanese Unexamined Patent Publication No. 2004-320683 (paragraph nos. [0044] to [0052], FIG. 1)).

Let us consider the case where, in the EOS network system 100 shown in FIG. 14, failure has occurred in the outbound port of the client device 101 connected to the client route R1. In EOS, when failure occurs on the network, devices with the GFP function stop outputting frames to the egress node in accordance with the GFP signal propagation function.

Also, it is assumed that the client device 101 has the function of link aggregation (IEEE 802.3h). The link aggregation is a connection scheme whereby a plurality of physical links can be treated as a single virtual link. By configuring the link aggregation in a span where the bandwidth locally increases, it is possible to cope with local increase in the traffic.

With the link aggregation function, while a certain span is operating normally, frames can be transmitted by using n links, and if m (<n) links become unavailable, frames are transmitted by using (n–m) links (the bandwidth decreases correspondingly, compared with the case of using n links).

FIG. 15 illustrates a case where failure has occurred while the link aggregation function is performed. If failure occurs in the client route R1 as illustrated, the EOS host 112 recognizes that failure has occurred on the originating side, because the input of frames from the EOS host 111 stops, and thus discontinues outputting frames to the client route R3 (shutoff control).

Also, since the input of frames from the client route R3 stops, the client device 102 recognizes that failure has occurred on the originating side, and switches the receiving mode from dual-route reception via the client routes R3 and R7, executed until the occurrence of failure, to single-route reception via the client route R7 only.

Further, on detecting the failure of the client route R1, the client device 101 exercises the link aggregation and redundancy function so that Ethernet frames, which had been output to both the client routes R1 and R5 before the occurrence of the failure, may be output only to the client route R5 (the transmission bandwidth reduces by half, compared with the dual-route output). The process described above enables the communication to be continued even in the event failure occurs on the part of the client device 101 or 102.

Let us now consider the case where failure has occurred in the SDH route NW1 within the SDH network 110. In the following, SDH is taken as an example, but the same applies to SONET. FIG. 16 illustrates the case where failure has occurred in the SDH network 110. If the SDH route NW1 fails, the EOS host 112 detects the failure and stops outputting SDH frames to the client route R3 (shutoff control), thus enabling the client device 102 to recognize that failure has occurred on the originating side.

However, the GFP signal propagation function does not allow the EOS host 112 to notify the EOS host 111 of SDH failure, so that the EOS host 111 is unable to control the output of the client device 101, giving rise to a problem that the client device 101 keeps outputting Ethernet frames uselessly. Also, since the client device 101 is unaware of the failure, the link aggregation function fails to be exercised.

Further, if in this state the EOS host 112, which has detected the SDH failure, shuts off the input thereto from the client route R4, communication deadlock takes place, making the communication irrecoverable.

Furthermore, consider a case where RDI-P which is an alarm of SDH failure to an upstream side is used to perform shutoff control. Since RDI-P is always detected in SDH one-way transmission (one-way communication) (in one-way communication, UNEQ-P is transferred at an ADD station, and RDI-P is transferred at a DROP station which receives the UNEQ-P), this case has a problem that RDI-P cannot be used as a condition for the shutoff control. (ITU-T G783: Occurrence conditions of PDI-P: AIS-P, LOP-P, LOM, PLM-P, TIM-P, UNEQ-P)

Thus, in the conventional EOS network system, where an SDH route in the SDH network has failed, the receiving client device for which Ethernet frames are destined can be notified of the failure by virtue of the GFP shutoff control, but the originating client device from which the Ethernet frames are originated is unable to recognize the failure, giving rise to a problem that the originating client device keeps outputting Ethernet frames.

SUMMARY

The present invention was created in view of the above circumstances, and an object thereof is to provide a failure handling system capable of properly carrying out failure notification as well as shutoff control for an originating device, thereby improving the operability of an EOS network.

To achieve the object, there is provided a failure handling system for handling failure occurring on a network. The failure handling system comprises client devices connected to the network for exchanging communication frames with each other through the network, first and second transmission devices, and a network management device. The first transmission device includes a failure detector for detecting occurrence of a failure in the network, an outgoing frame shutoff controller operative in response to detection of the failure to perform shutoff control on the local device such that the local device stops outputting the communication frames to a receiving client device for which the communication frames are destined, and a failure notifier for sending, to a network manager, a failure notification notifying that the failure has been detected. The second transmission device includes an incoming frame shutoff controller operative in response to reception of a shutoff command to perform shutoff control on an originating client device with which the receiving client device is associated and from which the communication frames are originated such that the originating client device stops outputting the communication frames. The network management device as the network manager includes a communication route manager for managing communication routes through which the client devices communicate with each other across the network, and a shutoff information sender responsive to reception of the failure notification from the first transmission device, for looking up the communication routes to identify the second transmission device connected with the originating client device, and sending the shutoff command to the second transmission device.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
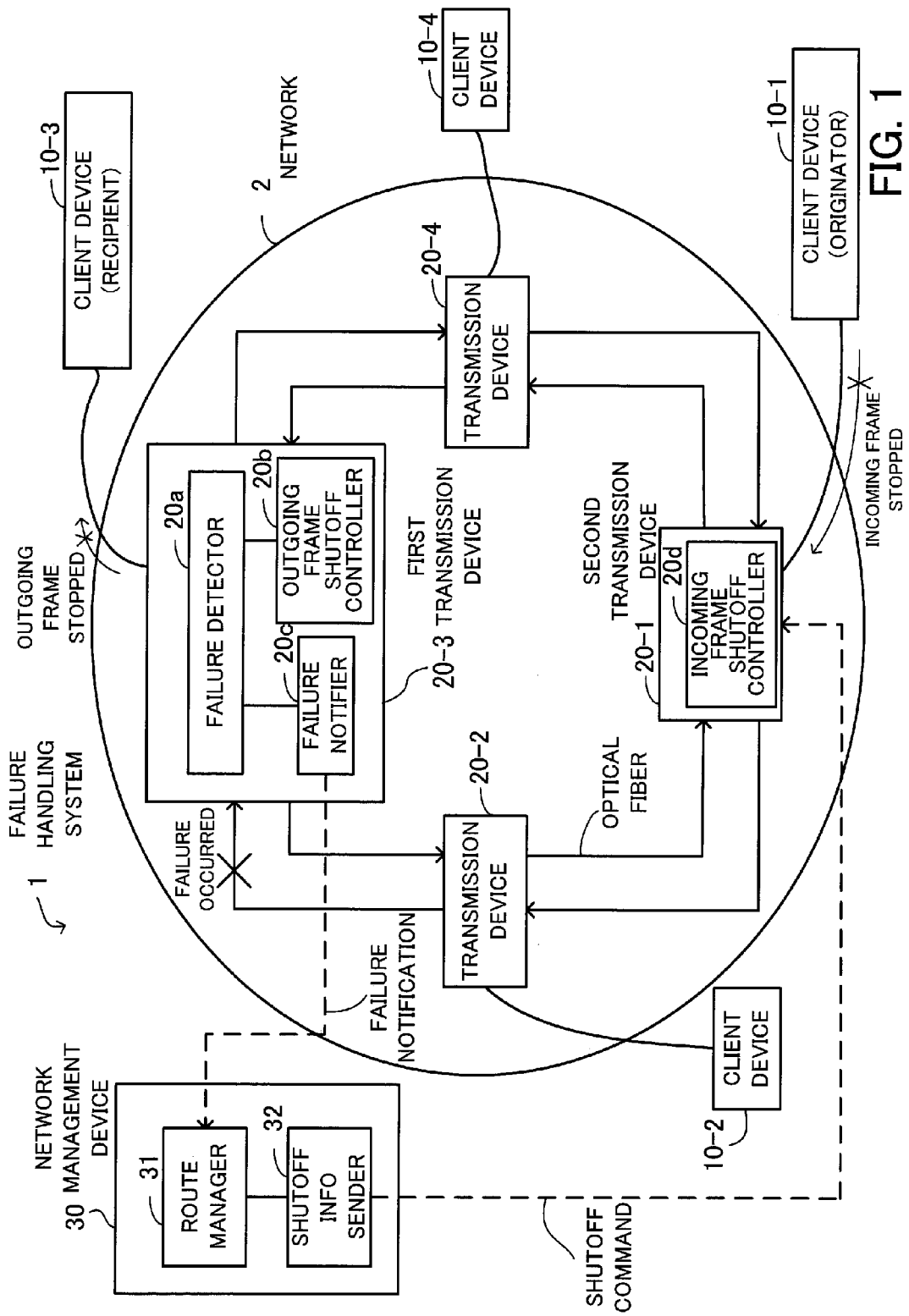
FIG. 1 illustrates the principle of a failure handling system.

Preferred embodiments of the present invention will be described below with reference to the accompanying drawings, wherein like reference numerals refer to like elements throughout. FIG. 1 illustrates the principle of a failure handling system according to a first embodiment. The failure handling system 1 comprises client devices 10-1 to 10-4, transmission devices 20-1 to 20-4 and a network management device 30, and performs processes (failure notification, shutoff control) related to failure occurring on a network 2.

The client devices 10-1 to 10-4 are connected to the network 2 (more specifically, the client devices 10-1 to 10-4 are connected to the respective transmission devices 20-1 to 20-4) and exchange communication frames with each other through the network 2. Commonly known client devices are routers (L3 switches), L2 switches, etc.

The transmission devices 20-1 to 20-4 are connected to each other by two optical fibers so as to form the dual ring network 2. A first transmission device (hereinafter the transmission device 20-3) includes a failure detector 20a, an outgoing frame shutoff controller 20b, and a failure notifier 20c. A second transmission device (hereinafter the transmission device 20-1) includes an incoming frame shutoff controller 20d.

In the transmission device 20-3, the failure detector 20a detects an input break or the like as failure occurring in the network 2. When failure is detected, the outgoing frame shutoff controller 20b performs shutoff control on the local device so that communication frames may not be output to the receiving client device 10-3 for which the communication frames are destined. Namely, the output of communication frames from the transmission device 20-3 to the client device 10-3 is stopped. The failure notifier 20c notifies a network manager (network management device 30) that failure has been detected.

When a shutoff command is received from the network management device 30, the incoming frame shutoff controller 20d of the transmission device 20-1 performs shutoff control on the originating client device 10-1 with which the receiving client device 10-3 is associated and from which the communication frames are originated such that the originating client device 10-1 stops outputting the communication frames.

The network management device 30 includes a communication route manager 31 and a shutoff information sender 32. The communication route manager 31 manages all communication routes through which the client devices communicate with each other across the network 2. When the failure notification is received from the transmission device 20-3, the shutoff information sender 32 looks up the communication routes to identify the transmission device 20-1 connected with the originating client device 10-1, and sends a shutoff command to the transmission device 20-1. The network management device 30 is connected to one of the transmission devices 20-1 to 20-4 so as to manage the entire network 2, though not illustrated as such in FIG. 1.

Figure 2:
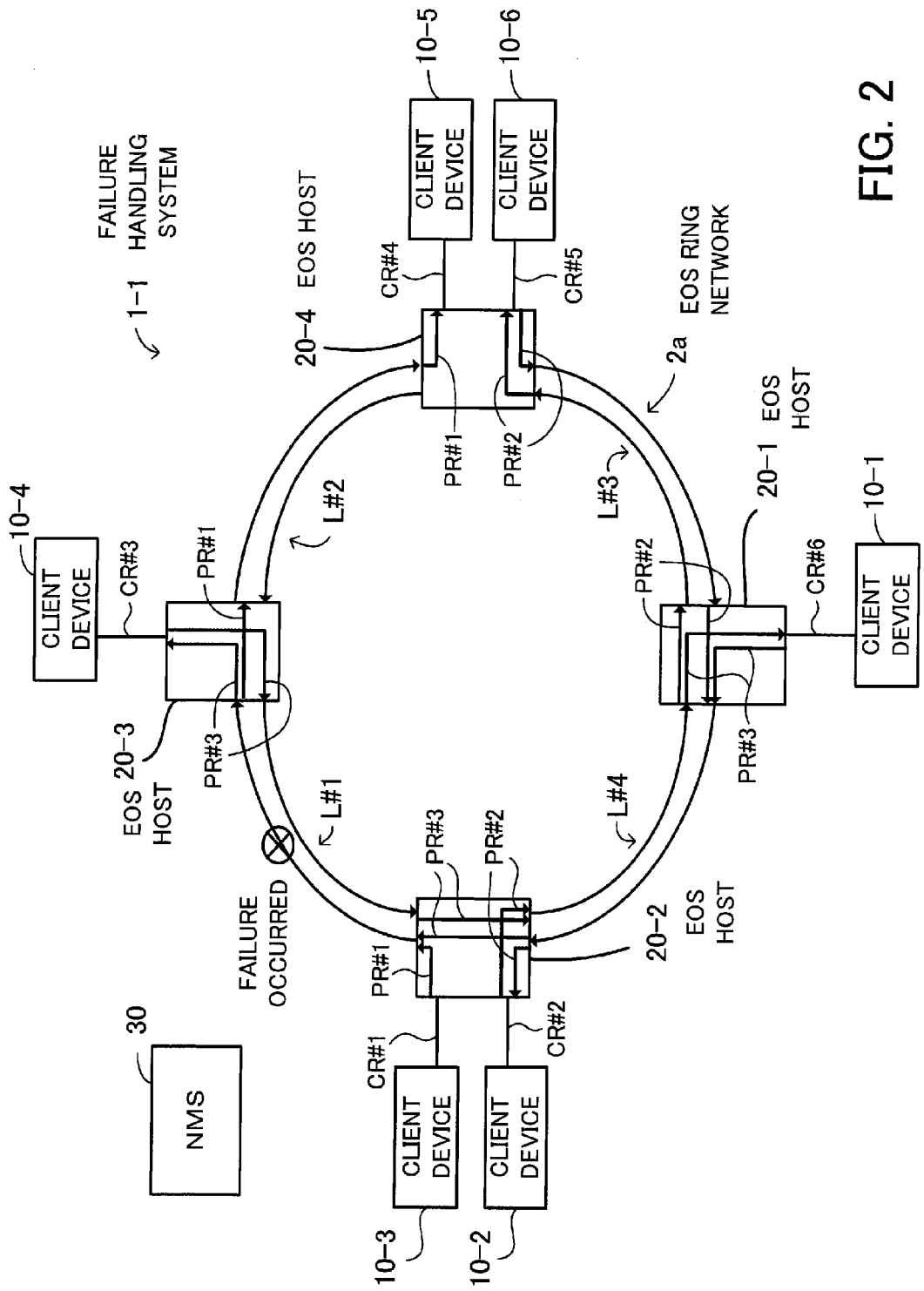
FIG. 2 shows an entire configuration of the failure handling system applied to EOS.

The following describes in detail the configuration and operation of the failure handling system 1 applied to EOS (Ethernet over SDH/SONET). FIG. 2 shows an entire configuration of the failure handling system applied to EOS. The failure handling system 1-1 comprises client devices 10-1 to 10-6, EOS hosts 20-1 to 20-4, and an NMS (Network Management System) 30. The EOS host and the NMS correspond, respectively, to the transmission device and the network management device shown in FIG. 1.

The EOS hosts 20-1 to 20-4 are connected to each other by two optical fibers so as to constitute an EOS dual ring network 2a. Specifically, the EOS hosts 20-1 and 20-2 are connected to each other by an SDH link L#4, and the EOS hosts 20-2 and 20-3 are connected to each other by an SDH link L#1. The EOS hosts 20-3 and 20-4 are connected to each other by an SDH link L#2, and the EOS hosts 20-4 and 20-1 are connected to each other by an SDH link L#3. These SDH links constitute clockwise and counterclockwise redundant links.

Also, the EOS host 20-1 is connected with the client device 10-1 by a client route CR#6. The EOS host 20-2 is connected with the client device 10-2 by a client route CR#2 and is also connected with the client device 10-3 by a client route CR#1. The EOS host 20-3 is connected with the client device 10-4 by a client route CR#3. The EOS host 20-4 is connected with the client device 10-5 by a client route CR#4 and is also connected with the client device 10-6 by a client route CR#5. The NMS 30 is connected to one of the EOS hosts 20-1 to 20-3, though not illustrated as such in FIG. 2.

Figure 3:
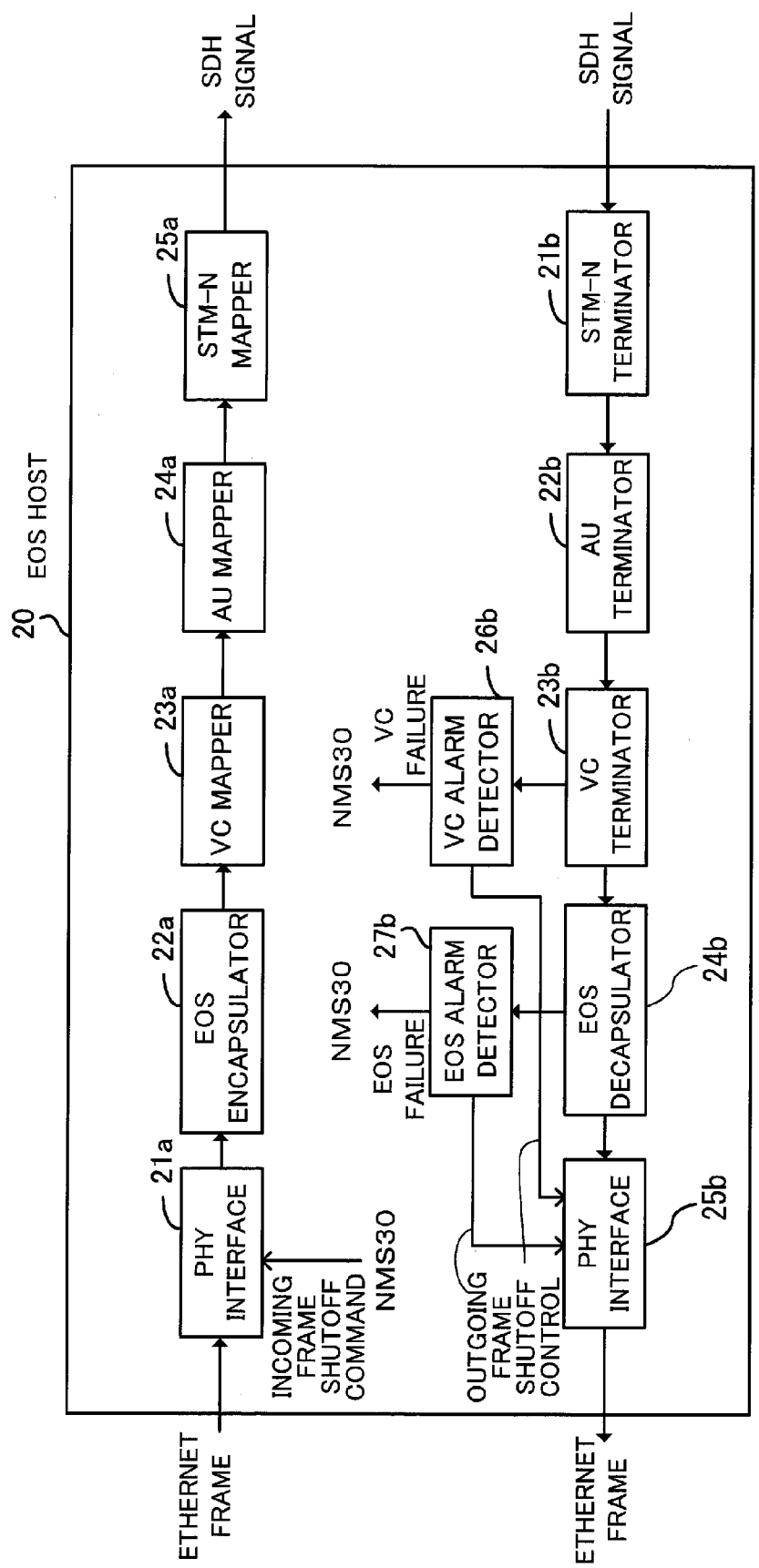
FIG. 3 shows an internal configuration of an EOS host.

FIG. 3 shows an internal configuration of the EOS host. The EOS host 20 comprises a PHY (Physical) interface 21a, an EOS encapsulator 22a, a VC (Virtual Container) mapper 23a, an AU (Administrative Unit) mapper 24a, an STM (Synchronous Transport Module)-N mapper 25a, an STM-N terminator 21b, an AU terminator 22b, a VC terminator 23b, an EOS decapsulator 24b, a PHY interface 25b, a VC alarm detector 26b, and an EOS alarm detector 27b.

The PHY interface 21a functions as the incoming frame shutoff controller 20d. The VC alarm detector 26b and the EOS alarm detector 27b function as the failure detector 20a, and the PHY interface 25b functions as the outgoing frame shutoff controller 20b.

Also, the PHY interface 21a terminates the Ethernet frame received from the corresponding client device. Further, on receiving a shutoff command from the NMS 30, the PHY interface 21a performs shutoff control on the client device such that the client device stops outputting Ethernet frames to the EOS host 20. The EOS encapsulator 22a encapsulates the received Ethernet frame into an intermediate format to allow the frame to be mapped to SDH signal. For example, the Ethernet frame is encapsulated by being embedded into a GFP frame.

The VC mapper 23a generates an SDH path layer signal (specific examples: VC12 mapping, VC4 mapping, etc.). The AU mapper 24a adds a head pointer to the beginning of the SDH path layer signal (specific example: AU4 mapping). The STM-N mapper 25a adds an SDH overhead to the signal affixed with the pointer to generate an STM-N SDH signal, and sends the generated signal to the neighboring EOS host.

The STM-N terminator 21b terminates the overhead of the received SDH signal. The AU terminator 22b terminates the head pointer affixed to the beginning of the SDH path layer signal (specific example: AU4 termination). The VC terminator 23b terminates the SDH path layer signal (specific examples: VC12 termination, VC4 termination, etc.).

The EOS decapsulator 24b decapsulates the intermediate format to extract the Ethernet frame. The VC alarm detector 26b detects failure in VC layer (specific examples: AIS ALM, UNEQ ALM, etc.). The EOS alarm detector 27b detects failure in EOS layer (specific example: GFP ALM). The PHY interface 25b sends the extracted Ethernet frame to the corresponding client device. Also, when failure in the VC/EOS layer is detected, the PHY interface 25b performs shutoff control such that the output of Ethernet frames from the EOS host 20 to the client device is stopped. Failure in the VC layer includes anomaly of the AU pointer, for example. Failure in the EOS layer includes, for example, link failure (link disconnection) caused on the links of the EOS ring network 2a and path failure (path disconnection) caused in the EOS hosts 20-1 to 20-4.

Figure 4:
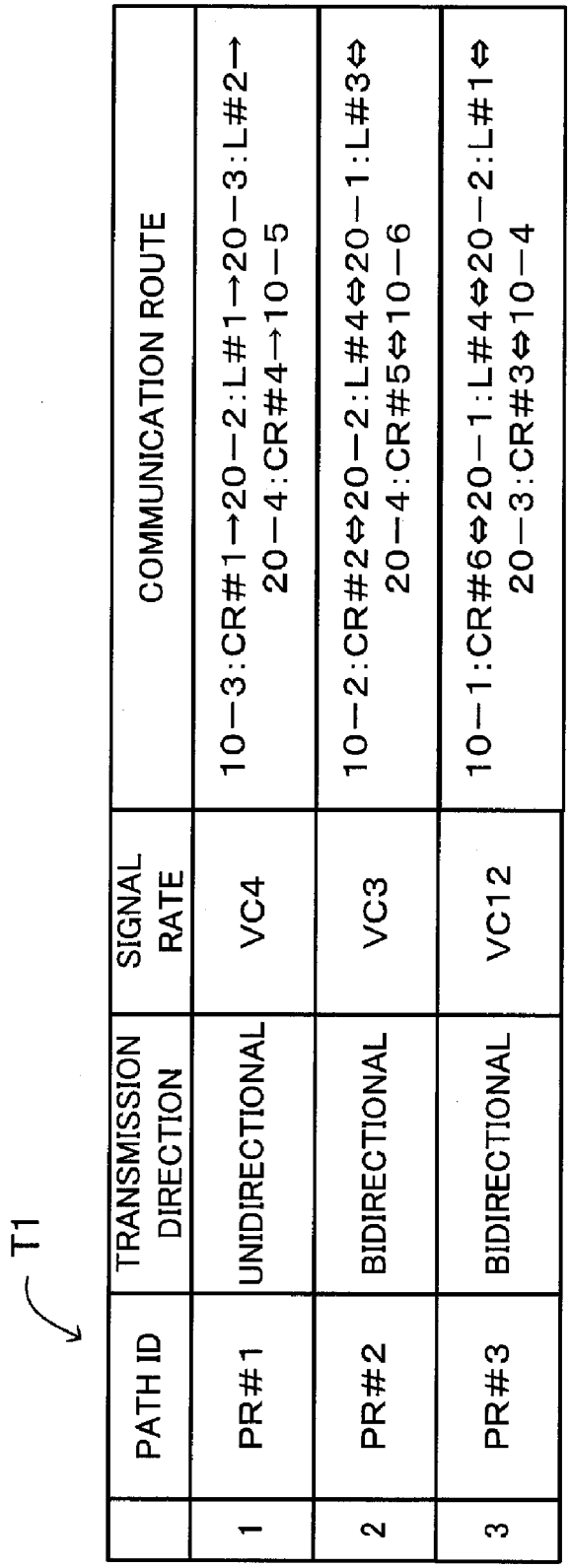
FIG. 4 shows how communication routes are managed by an NMS.

FIG. 4 shows communication routes managed by the NMS 30. A table T1, which is stored in the database prepared in the communication route manager 31, has columns labeled path ID, transmission direction, signal rate and communication route, and indicates the communication routes of the system shown in FIG. 2.

Row no. 1 shows information about a communication route whereby Ethernet frames are sent in one direction from the client device 10-3 to the client device 10-5 at the signal rate VC4 (140 Mbps) through path routes PR#1 in the EOS hosts. Specifically, the communication route is: client device 10-3: client route CR#1→EOS host 20-2:SDH link L#1→EOS host 20-3:SDH link L#2→EOS host 20-4:client route CR#4→client device 10-5.

Row no. 2 indicates information about a communication route whereby Ethernet frames are sent bi-directionally between the client devices 10-2 and 10-6 at the signal rate VC3 (340 Mbps) through path routes PR#2 in the EOS hosts. Namely, the specified communication route is: client device 10-2:client route CR#2⇔EOS host 20-2:SDH link L#4 ⇔EOS host 20-1:SDH link L#3⇔EOS host 20-4:client route CR#5⇔client device 10-6.

Row no. 3 shows information about a communication route whereby Ethernet frames are sent bi-directionally between the client devices 10-1 and 10-4 at the signal rate VC12 (2 Mbps) through path routes PR#3 in the EOS hosts. The specified communication route is: client device 10-1:client route CR#6⇔EOS host 20-1:SDH link L#4⇔EOS host 20-2:SDH link L#1⇔EOS host 20-3:client route CR#3⇔client device 10-4.

Figure 5:
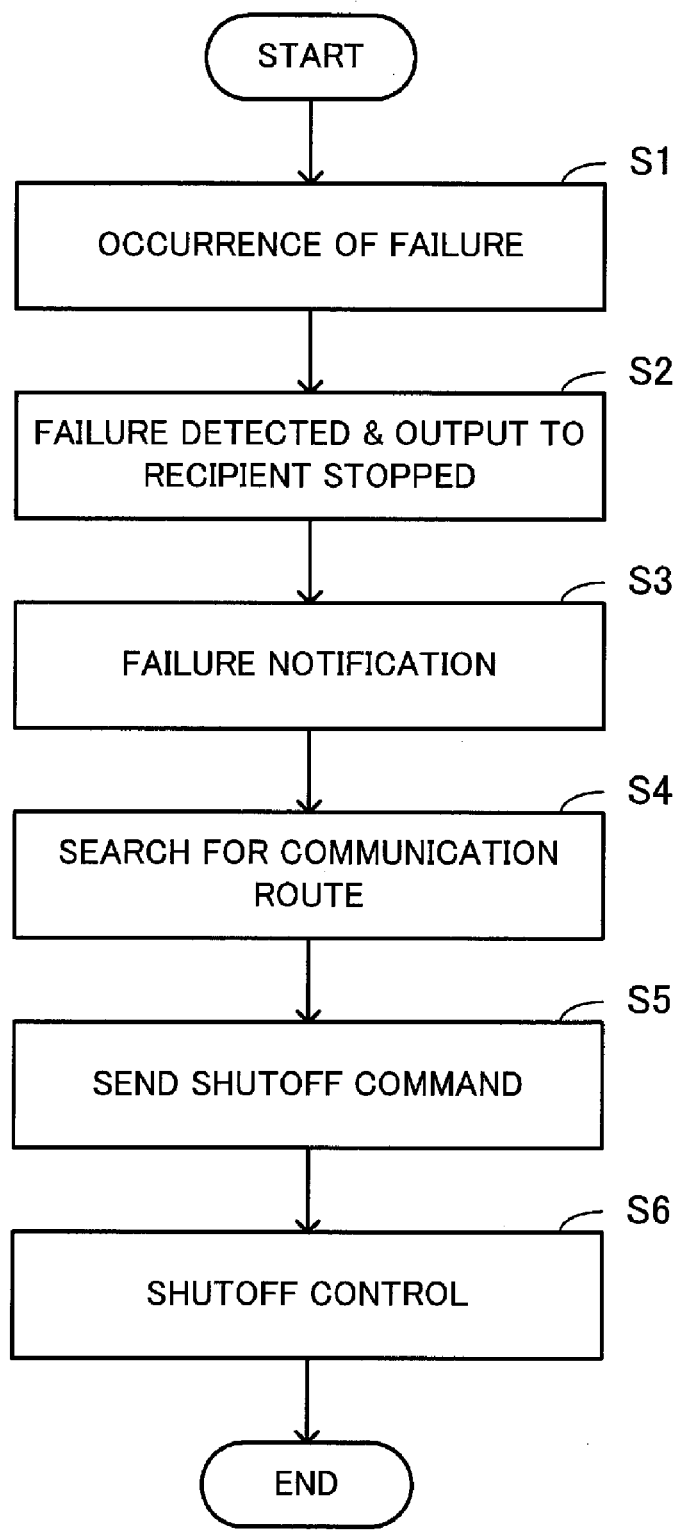
FIG. 5 is a flowchart of a process executed upon detection of failure.

Failure detection will be now described with reference to FIGS. 2 and 4 explained above and the flowchart of FIG. 5. FIG. 5 illustrates a process executed upon detection of failure.

S1: Let us suppose that one line of the SDH link L#1 fails.

S2: The EOS hosts 20-3 and 20-4 detect failure in the EOS layer (failure in the VC layer is also detected at the same time). The EOS host 20-3 stops outputting Ethernet frames to the client device 10-4, and the EOS host 20-4 stops outputting Ethernet frames to the client device 10-5.

S3: The EOS host 20-3 notifies the NMS 30 of the occurrence of the failure in the VC/EOS layer as well as of the shutoff of the client route CR#3. Also, the EOS host 20-4 notifies the NMS 30 of the occurrence of the failure in the VC/EOS layer and of the shutoff of the client route CR#4.

S4: Based on the row no. 3 in the table T1 shown in FIG. 4, the communication route manager 31 in the NMS 30 searches for the EOS host and the client route that are associated with the client route CR#3 connected to the EOS host 20-3. In this instance, the EOS host 20-1 and the client route CR#6 are identified.

Also, based on the row no. 1 in the table T1, the communication route manager 31 searches for the EOS host and the client route that are associated with the client route CR#4 connected to the EOS host 20-4. As a result, the EOS host 20-2 and the client route CR#1 are identified.

S5: The shutoff information sender 32 of the NMS 30 sends a shutoff command to each of the EOS hosts 20-1 and 20-2. The NMS 30 holds information about the EOS hosts to which the shutoff command has been sent.

S6: On receiving the shutoff command, the EOS host 20-1 performs the shutoff control on the client device 10-1 such that the client device 10-1 stops outputting Ethernet frames. Also, on receiving the shutoff command, the EOS host 20-2 carries out the shutoff control on the client device 10-3 such that the client device 10-3 stops outputting Ethernet frames.

Figure 6:
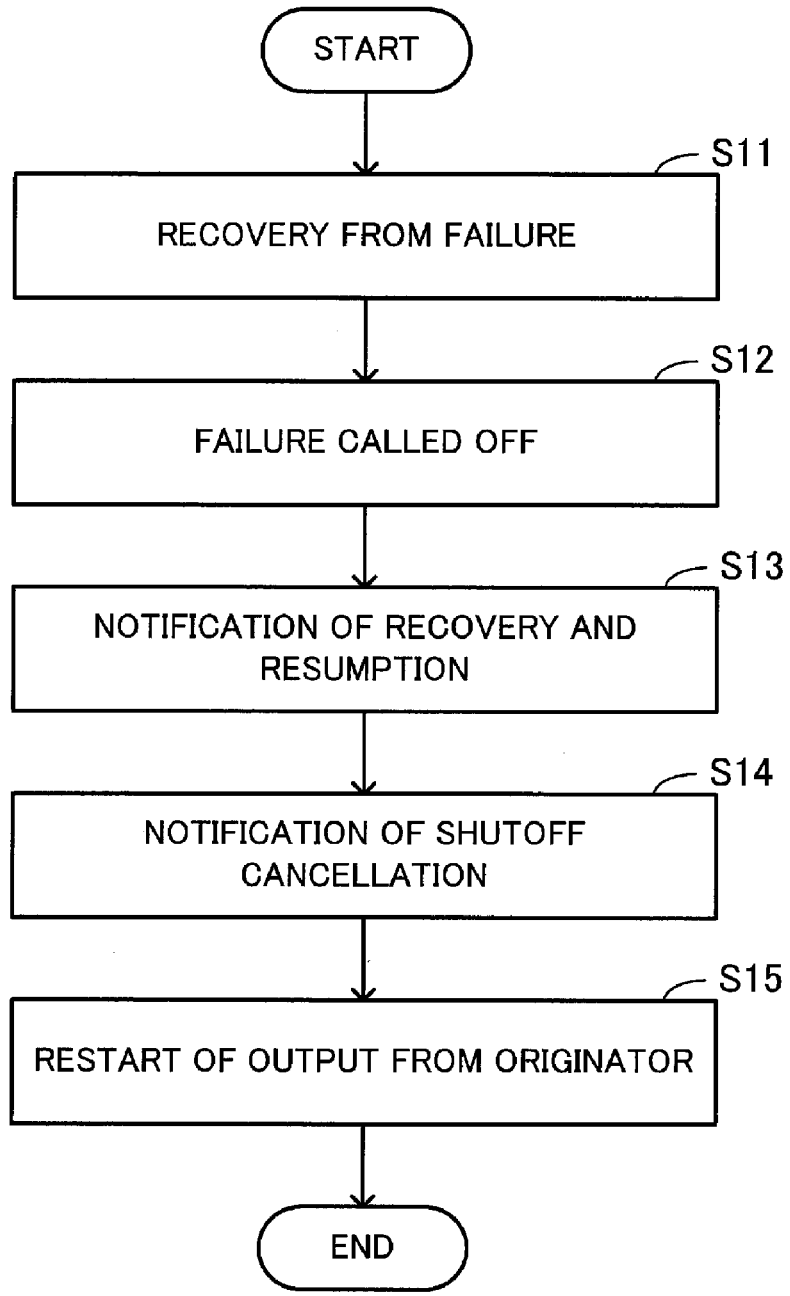
FIG. 6 is a flowchart of a process executed upon recovery from failure.

A process executed upon recovery from failure will be now explained with reference to the flowchart of FIG. 6.

S11: The failed line of the SDH link L#1 recovers.

S12: The EOS hosts 20-3 and 20-4 call off the failure in the VC/EOS layer.

S13: The EOS host 20-3 notifies the NMS 30 of the failure recovery as well as of the resumption of the client route CR#3. Similarly, the EOS host 20-4 notifies the NMS 30 of the failure recovery and of the resumption of the client route CR#4.

S14: When notified of the failure recovery, the NMS 30 sends a shutoff cancellation notification to each of the EOS hosts 20-1 and 20-2.

S15: On receiving the shutoff cancellation notification, the EOS host 20-1 permits the client device 10-1 to restart outputting Ethernet frames thereto. Also, on receiving the shutoff cancellation notification, the EOS host 20-2 permits the client device 10-3 to restart outputting Ethernet frames thereto.

As explained above, where failure has occurred in the network, the failure handling system 1 not only causes a corresponding EOS host to stop outputting Ethernet frames to the receiving client device but also causes the originating client device to stop outputting Ethernet frames to a corresponding EOS host. It is therefore possible to solve the problem associated with the conventional system, that is, the awkward situation where the originating client device uselessly keeps outputting Ethernet frames because of its inability to recognize failure.

Figure 7:
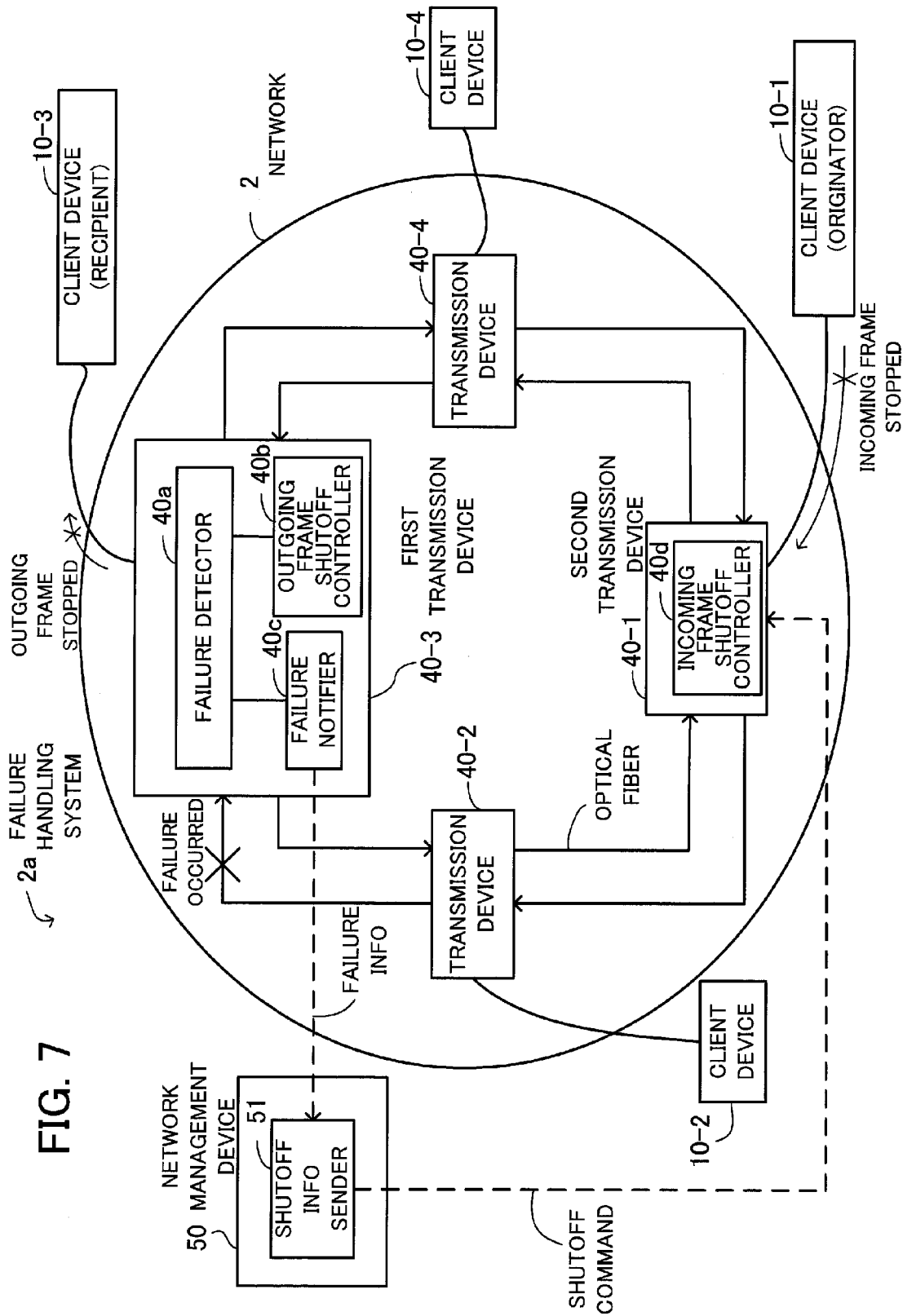
FIG. 7 illustrates the principle of another failure handling system.

A failure handling system according to a second embodiment will be now described. FIG. 7 illustrates the principle of the failure handling system. The failure handling system 2a of the second embodiment comprises client devices 10-1 to 10-4, transmission devices 40-1 to 40-4 and a network management device 50, and performs processes (failure notification, shutoff control) related to failure occurring on a network 2.

The client devices 10-1 to 10-4 are connected to the network 2 (more specifically, the client devices 10-1 to 10-4 are connected to the respective transmission devices 40-1 to 40-4) and exchange communication frames with each other through the network 2.

The transmission devices 40-1 to 40-4 are connected to each other by two optical fibers so as to form the dual ring network 2. A first transmission device (hereinafter the transmission device 40-3) includes a failure detector 40a, an outgoing frame shutoff controller 40b, and a failure notifier 40c. A second transmission device (hereinafter the transmission device 40-1) includes an incoming frame shutoff controller 40d.

In the transmission device 40-3, the failure detector 40a detects an input break or the like as failure occurring in the network 2. When failure is detected, the outgoing frame shutoff controller 40b performs shutoff control on the local device so that communication frames may not be output to the receiving client device 10-3 for which the communication frames are destined. Also, when failure is detected, the failure notifier 40c sends, to a network manager (network management device 50), failure information including at least the identifier (ID) of the transmission device (transmission device 40-1) connected with the originating client device 10-1 with which the receiving client device 10-3 is associated and from which the communication frames are originated.

When a shutoff command is received, the incoming frame shutoff controller 40d of the transmission device 40-1 performs shutoff control on the originating client device 10-1 so that the originating client device 10-1 may stop outputting communication frames.

The network management device 50 includes a shutoff information sender 51. On receiving the failure information from the transmission device 40-3, the shutoff information sender 51 identifies the transmission device 40-1 connected with the originating client device 10-1 and sends a shutoff command to the transmission device 40-1.

Figure 8:
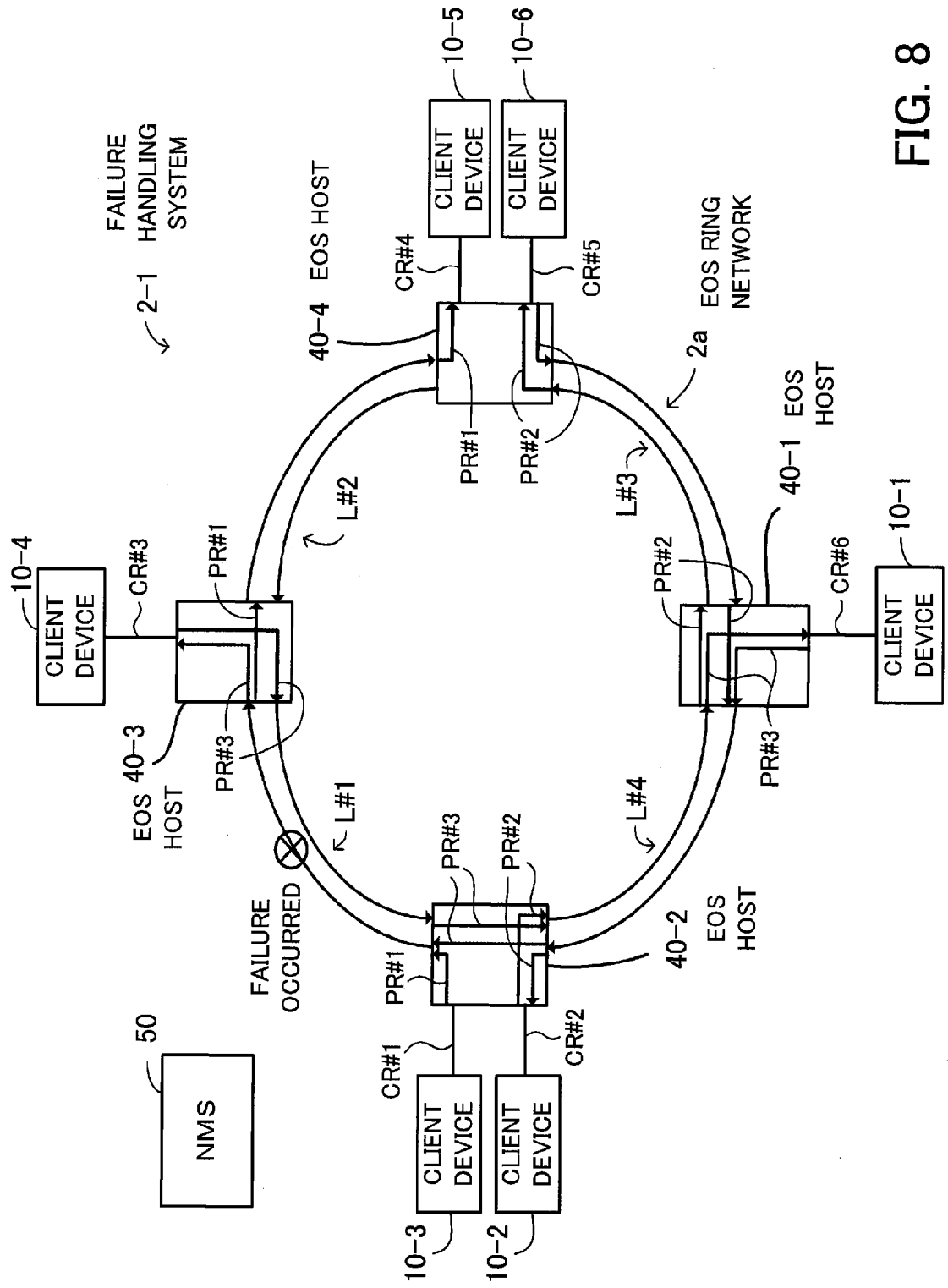
FIG. 8 shows an entire configuration of the failure handling system applied to EOS.

The following describes in detail the configuration and operation of the failure handling system 2a applied to EOS. FIG. 8 shows an entire configuration of the failure handling system applied to EOS. The configuration of the failure handling system 2-1 is basically identical with that shown in FIG. 2, and therefore, description thereof is omitted.

Figure 9:
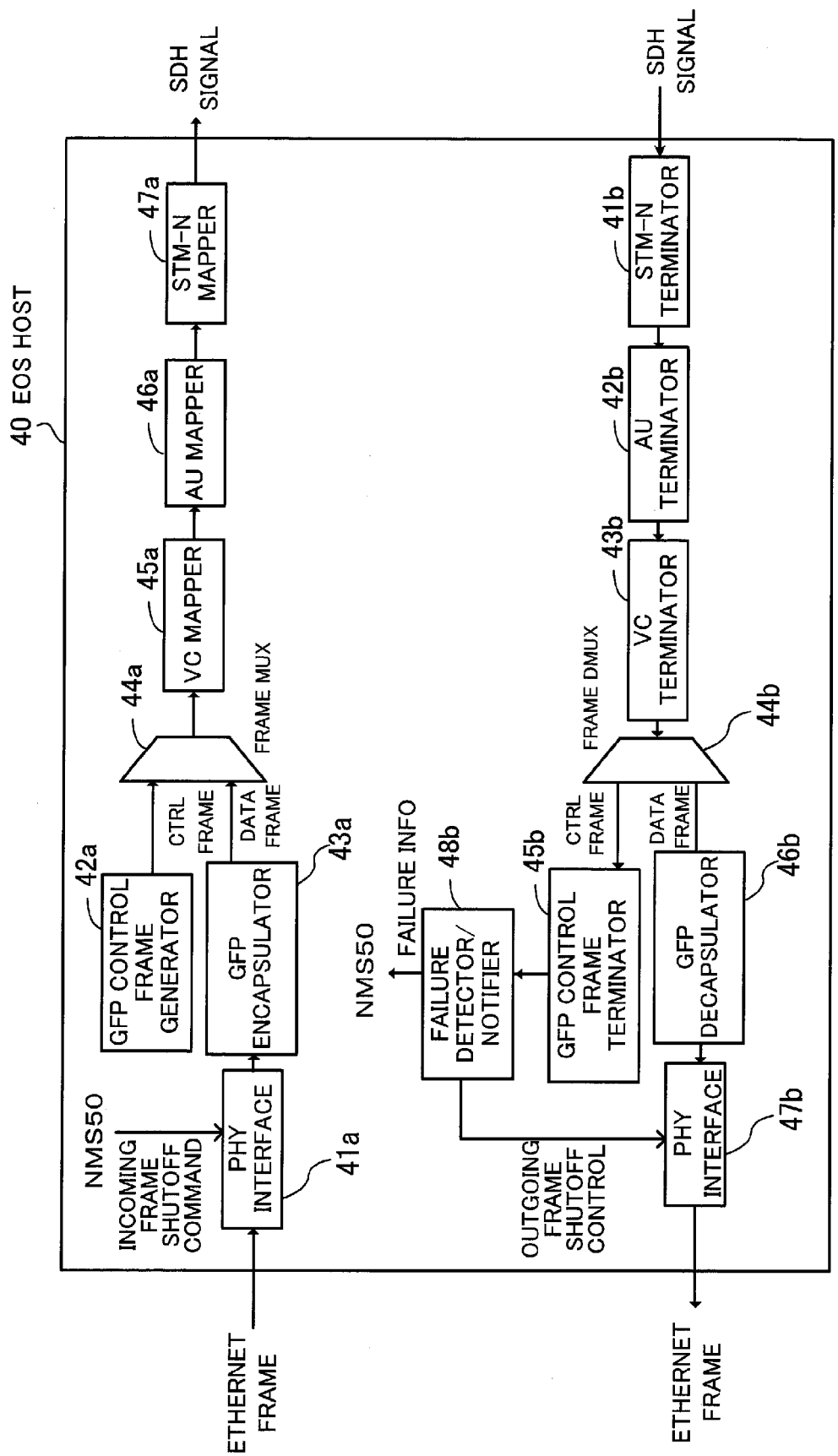
FIG. 9 shows an internal configuration of an EOS host.

FIG. 9 shows an internal configuration of the EOS host. The EOS host 40 comprises a PHY interface 41a, a GFP control frame generator 42a, a GFP encapsulator 43a, a multiplexer 44a, a VC mapper 45a, an AU mapper 46a, an STM-N mapper 47a, an STM-N terminator 41b, an AU terminator 42b, a VC terminator 43b, a demultiplexer 44b, a GFP control frame terminator 45b, a GFP decapsulator 46b, a PHY interface 47b, and a failure detector/notifier 48b.

The PHY interface 41a functions as the incoming frame shutoff controller 40d. The failure detector/notifier 48b functions as both the failure detector 40a and the failure notifier 40c. The PHY interface 47b functions as the outgoing frame shutoff controller 40b.

Also, the PHY interface 41a terminates the Ethernet frame received from the corresponding client device. Further, on receiving a shutoff command from the NMS 50, the PHY interface 41a performs shutoff control on the client device such that the client device stops outputting Ethernet frames to the EOS host 40. The GFP control frame generator 42a generates a GFP control frame. The GFP encapsulator 43a encapsulates, into a GFP data frame, the signal output from the PHY interface 41a. The multiplexer 44a multiplexes the GFP control and data frames to generate a multiplexed frame.

The VC mapper 45a generates an SDH path layer signal (specific examples: VC12 mapping, VC4 mapping, etc.). The AU mapper 46a adds a head pointer to the beginning of the SDH path layer signal (specific example: AU4 mapping). The STM-N mapper 47a adds an SDH overhead to the signal affixed with the pointer to generate an STM-N SDH signal, and sends the generated signal to the neighboring EOS host.

The STM-N terminator 41b terminates the overhead of the received SDH signal. The AU terminator 42b terminates the head pointer affixed to the beginning of the SDH path layer signal (specific example: AU4 termination). The VC terminator 43b terminates the SDH path layer signal (specific examples: VC12 termination, VC4 termination, etc.).

The demultiplexer 44b demultiplexes the signal output from the VC terminator 43b to extract the GFP control frame and the GFP data frame. The GFP control frame terminator 45b terminates the GFP control frame. The GFP decapsulator 46b decapsulates the GFP data frame to extract the Ethernet frame. The PHY interface 47b sends the Ethernet frame to the corresponding client device. Also, when failure is detected, the PHY interface 47b performs shutoff control such that the output of Ethernet frames from the EOS host 40 to the client device is stopped. The failure detector/notifier 48b monitors the EOS host ID and client route ID contained in the GFP control frame (failure monitoring), generates failure information when necessary, and sends the generated information to the NMS 50.

Figure 10:
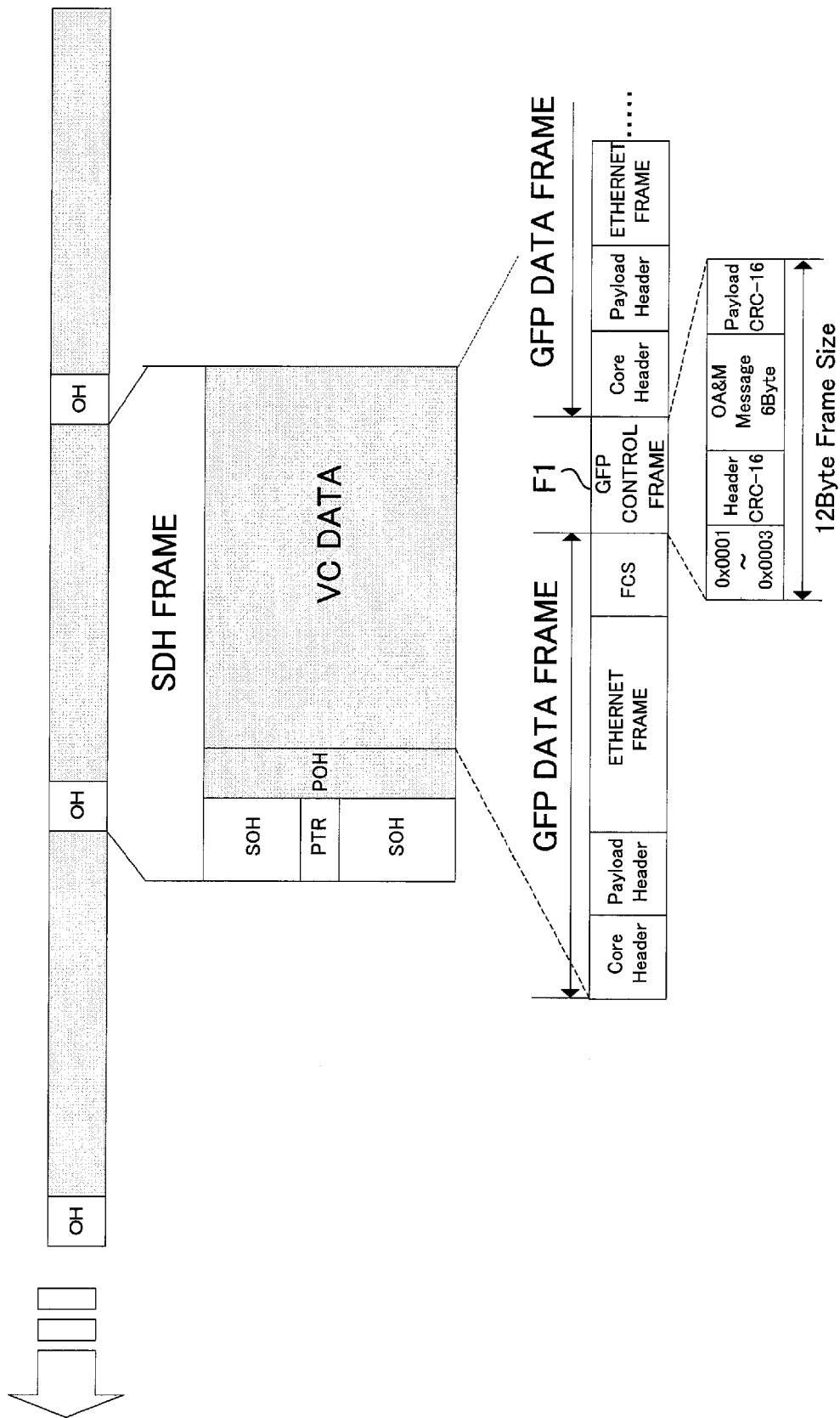
FIG. 10 shows the format of a GFP data frame.
Figure 11:
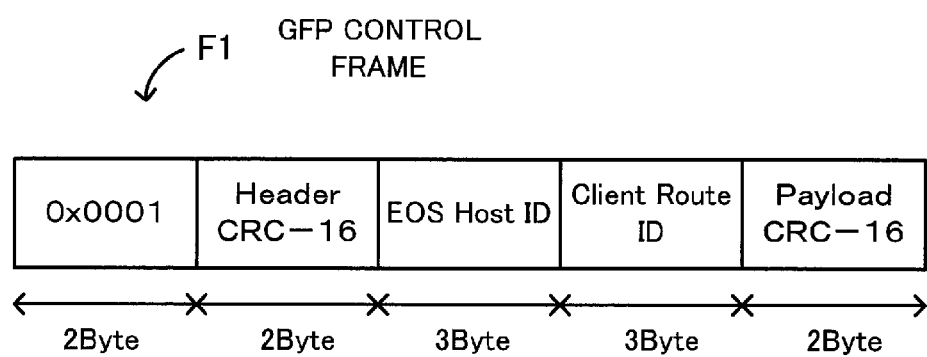
FIG. 11 shows the format of a GFP control frame.

FIG. 10 shows the format of the GFP data frame, and FIG. 11 shows the format of the GFP control frame. The SDH signal (SDH frame) traveling over the EOS ring network 2a consists of an overhead (OH) and VC data, and the overhead OH consists of an SOH (section overhead), a pointer (PTR), and a POH (path overhead).

The VC data includes GFP data frames and GFP control frames. The GFP data frame comprises a core header, a payload header, an Ethernet frame, and an FCS (Frame Check Sequence).

The GFP control frame F1 comprises a control frame identifier "0x0001" to "0x0003" (2 bytes), a header CRC (Cyclic Redundancy Check)-16 (2 bytes), an OA & M (Operation Administration and Maintenance) message (6 bytes), and a payload CRC-16 (2 bytes). In the failure handling system 2-1, the control frame identifier of the GFP control frame F1 is set to "0x0001", and the OA & M message is used in such a manner that the first and second halves thereof (3 bytes each) carry the EOS host ID and the client route ID, respectively.

Figure 12:
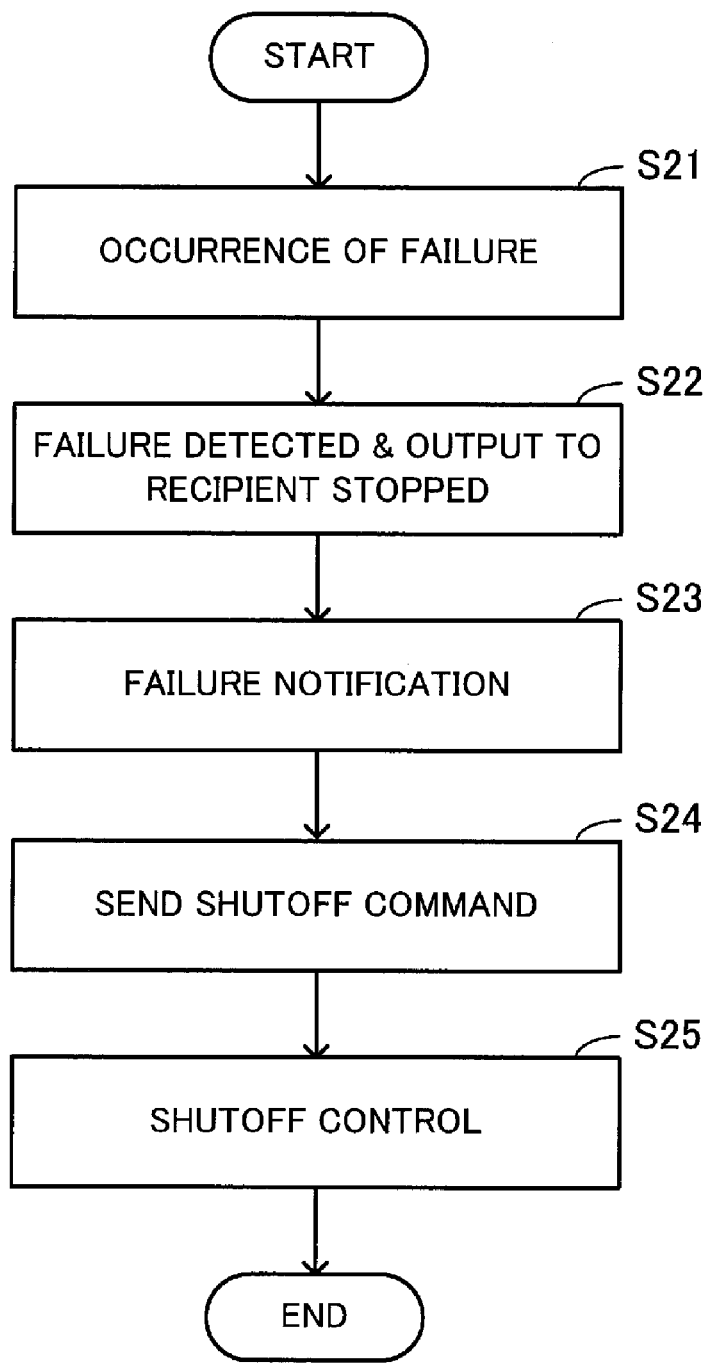
FIG. 12 is a flowchart of a process executed upon detection of failure.

Failure detection will be now described with reference to FIG. 8 explained above and the flowchart of FIG. 12. FIG. 12 illustrates a process executed upon detection of failure.

S21: Let it be assumed that failure occurs in one line of the SDH link L#1.

S22: The EOS hosts 40-3 and 40-4 detect GFP failure. The EOS host 40-3 stops outputting Ethernet frames to the client device 10-4, and the EOS host 40-4 stops outputting Ethernet frames to the client device 10-5.

S23: The EOS host 40-3 sends, to the NMS 50, failure information including the ID of the originating EOS host and the ID of the originating client route. The EOS host ID and client route ID notified in this case are "40-1" and "CR#6", respectively. Also, the EOS host 40-4 sends to the NMS 50 failure information including the ID of the originating EOS host and the ID of the originating client route. In this case, "40-2" and "CR#1" are notified as the EOS host ID and the client route ID, respectively.

S24: Based on the failure information received from the EOS host 40-3, the shutoff information sender 51 in the NMS 50 identifies the EOS host 40-1 and the client route CR#6, and sends a shutoff command to the EOS host 40-1. Also, based on the failure information received from the EOS host 40-4, the shutoff information sender 51 identifies the EOS host 40-2 and the client route CR#1, and sends a shutoff command to the EOS host 40-2.

S25: When the shutoff command is received, the EOS host 40-1 performs the shutoff control on the client device 10-1 such that the client device 10-1 stops outputting Ethernet frames. Also, on receiving the shutoff command, the EOS host 40-2 carries out the shutoff control on the client device 10-3 such that the client device 10-3 stops outputting Ethernet frames.

Figure 13:
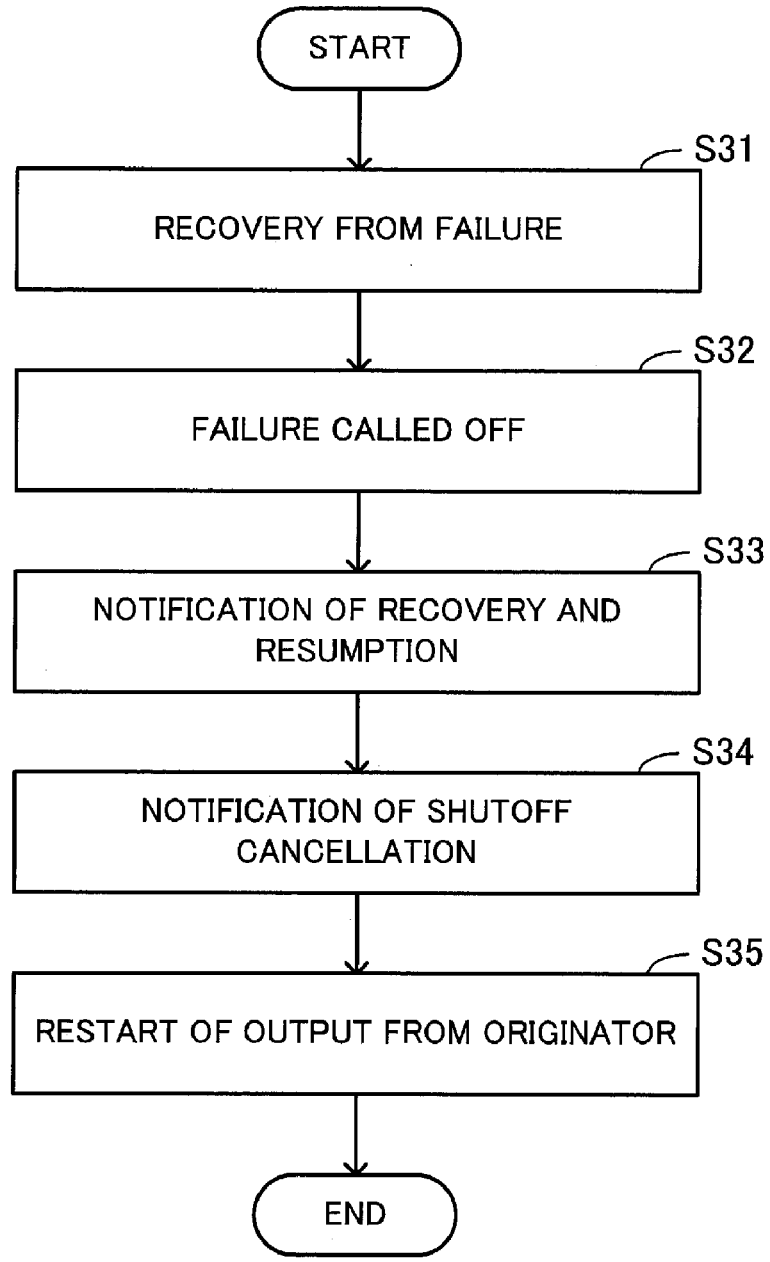
FIG. 13 is a flowchart of a process executed upon recovery from failure.
Figure 14:
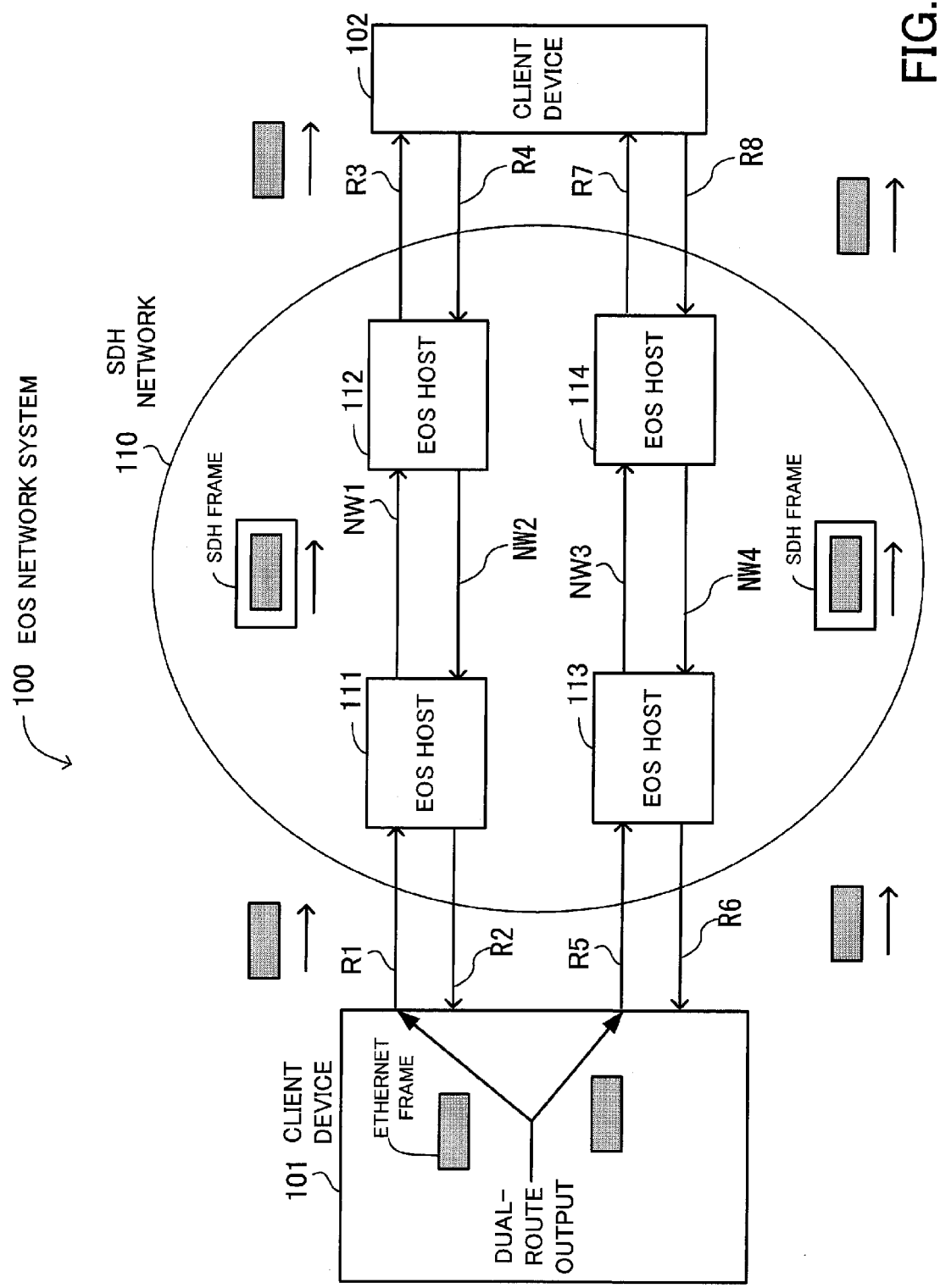
FIG. 14 shows an EOS network.
Figure 15:
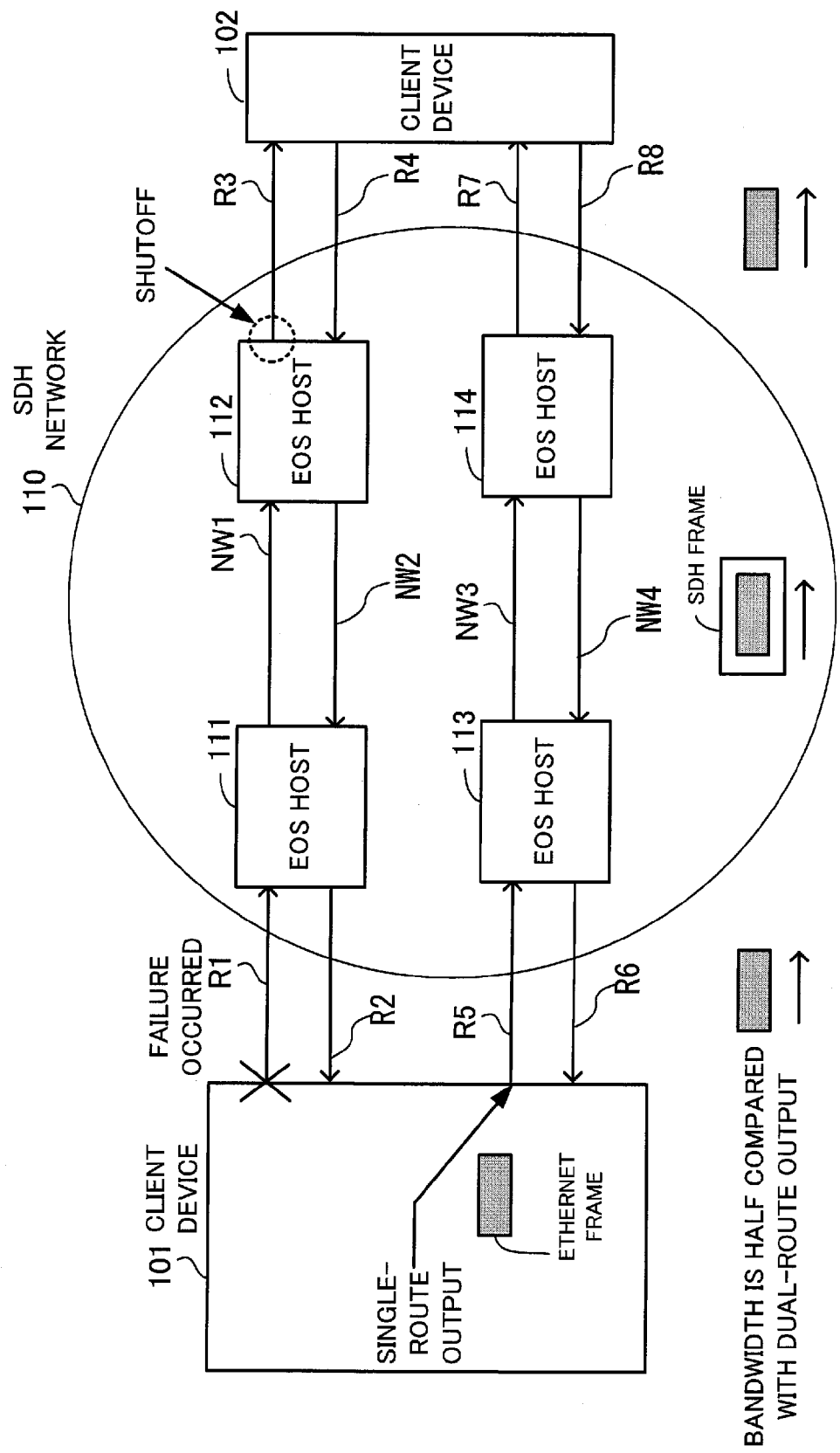
FIG. 15 illustrates a case where failure has occurred while link aggregation is functioning.
Figure 16:
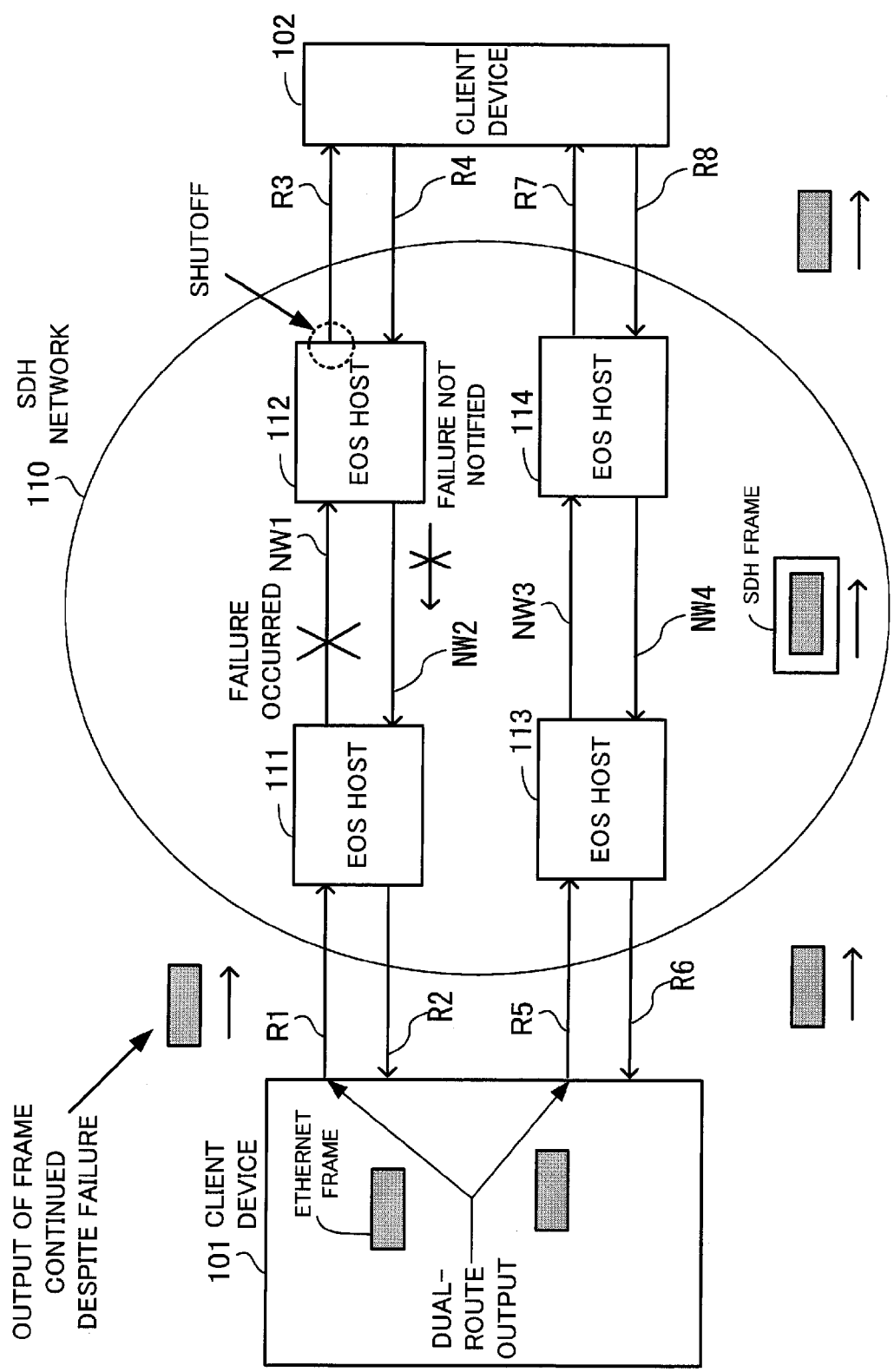
FIG. 16 illustrates a case where failure has occurred within an SDH network.

A process executed upon recovery from failure will be now explained with reference to the flowchart of FIG. 13.

S31: The failed line of the SDH link L#1 recovers.

S32: The EOS hosts 40-3 and 40-4 call off the GFP failure.

S33: The EOS host 40-3 notifies the NMS 50 of the failure recovery as well as of the resumption of the client route CR#3. Similarly, the EOS host 40-4 notifies the NMS 50 of the failure recovery and of the resumption of the client route CR#4.

S34: When notified of the failure recovery, the NMS 50 sends a shutoff cancellation notification to each of the EOS hosts 40-1 and 40-2.

S35: On receiving the shutoff cancellation notification, the EOS host 40-1 permits the client device 10-1 to restart outputting Ethernet frames thereto. Also, on receiving the shutoff cancellation notification, the EOS host 40-2 permits the client device 10-3 to restart outputting Ethernet frames thereto.

The failure handling system of the present invention is configured such that when the occurrence of failure in the network is detected, the first transmission device stops outputting communication frames to the receiving client device and also notifies the network management device of the occurrence of failure. The network management device, which manages the communication routes through which the client devices communicate with each other across the network, looks up the communication routes to identify the second transmission device connected with the originating client device, and sends a shutoff command to the second transmission device. On receiving the shutoff command, the second transmission device performs shutoff control on the originating client device such that the originating client device stops outputting communication frames to the second transmission device. Thus, the failure information can be sent to the originating device and also the shutoff control can be properly performed on the originating device. This avoids the situation where signal is uselessly output during the occurrence of failure, whereby the network operability is improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A failure handling system for handling failure occurring on a network, comprising:

client devices connected to the network, for exchanging communication frames with each other through the network;

a first transmission device including a failure detector for detecting occurrence of a failure in the network, an outgoing frame shutoff controller operative in response to detection of the failure to perform shutoff control on the local device such that the local device stops outputting the communication frames to a receiving client device for which the communication frames are destined, and a failure notifier for sending, to a network manager, a failure notification notifying that the failure has been detected;

a second transmission device including an incoming frame shutoff controller operative in response to reception of a shutoff command to perform shutoff control on an originating client device with which the receiving client device is associated and from which the communication frames are originated such that the originating client device stops outputting the communication frames; and a network management device as the network manager, the network management device including a communication route manager for managing communication routes through which the client devices communicate with each other across the network, and a shutoff information sender responsive to reception of the failure notification from the first transmission device, for looking up the communication routes to identify the second transmission device connected with the originating client device, and sending the shutoff command to the second transmission device.

2. The failure handling system according to claim 1, wherein, when recovery from the failure is detected by the failure detector, the outgoing frame shutoff controller cancels the shutoff control such that shutoff of the communications frames from the first transmission device to the receiving client device is canceled, the failure notifier sends, to the network management device, a cancellation notification notifying that the shutoff control has been canceled, the shutoff information sender sends, on receiving the cancellation notification from the first transmission device, a shutoff control cancellation command to the second transmission device connected with the originating client device, and the incoming frame shutoff controller cancels the shutoff control such that shutoff of the communication frames from the originating client device to the second transmission device is canceled.

3. A failure handling system for handling failure occurring on a network, comprising:

client devices connected to the network, for exchanging communication frames with each other through the network;

a first transmission device including a failure detector for detecting occurrence of a failure in the network, an outgoing frame shutoff controller operative in response to detection of the failure to perform shutoff control on the local device such that the local device stops outputting the communication frames to a receiving client device for which the communication frames are destined, and a failure notifier operative in response to detection of the failure to send, to a network manager, failure information including at least an identifier of a transmission device connected with an originating client device with which the receiving client device is associated and from which the communication frames are originated;

a second transmission device including an incoming frame shutoff controller operative in response to reception of a shutoff command to perform shutoff control on the originating client device such that the originating client device stops outputting the communication frames; and a network management device as the network manager, the network management device including a shutoff information sender responsive to reception of the failure information from the first transmission device, for identifying the second transmission device connected with the originating client device and sending the shutoff command to the second transmission device.

4. The failure handling system according to claim 3, wherein, when recovery from the failure is detected by the failure detector, the outgoing frame shutoff controller cancels the shutoff control such that shutoff of the communications frames from the first transmission device to the receiving client device is canceled, the failure notifier sends, to the network management device, a cancellation notification notifying that the shutoff control has been canceled, the shutoff information sender sends, on receiving the cancellation notification from the first transmission device, a shutoff control cancellation command to the second transmission device connected with the originating client device, and the incoming frame shutoff controller cancels the shutoff control such that shutoff of the communication frames from the originating client device to the second transmission device is canceled.

* * * * *